United States Patent
Patel

[15] 3,635,414

[45] Jan. 18, 1972

[54] CARTRIDGE CONTAINING TWO ENDLESS LOOPS OF MAGNETIC TAPE

[72] Inventor: Shashikant M. Patel, Garden Grove, Calif.

[73] Assignee: Certron Corporation, Anaheim, Calif.

[22] Filed: Nov. 24, 1969

[21] Appl. No.: 879,020

[52] U.S. Cl. ....................................242/55.19 A, 242/194
[51] Int. Cl. ....................................B65h 17/48
[58] Field of Search....................242/55.19 A, 55.19, 55.18, 242/194; 352/128, 78; 179/100.22; 274/4 B, 11 B

[56] References Cited

UNITED STATES PATENTS

| | | | |
|---|---|---|---|
| 3,001,025 | 9/1961 | Gaubert | 242/55.19 A UX |
| 3,252,670 | 5/1966 | Smith, II | 242/55.19 A |
| 3,285,527 | 11/1966 | Cole | 242/55.19 A |
| 3,367,592 | 2/1968 | Smith, II | 242/194 |

*Primary Examiner*—Billy S. Taylor
*Attorney*—Samuel Lindenberg and Arthur Freilich

[57] ABSTRACT

A magnetic tape cartridge for use with standard sound recording and reproducing apparatus is provided with two endless loops of tape coiled on a separate hub and platform assembly, each guided past apertures in a different end wall. Selection of a given tape for use is made by inserting into the using apparatus the end of the cartridge where the given tape is exposed through apertures.

9 Claims, 7 Drawing Figures

INVENTOR.
SHASHIKANT M. PATEL

BY Lindenberg & Freilich
ATTORNEYS

INVENTOR.
SHASHIKANT M. PATEL
BY
Lindenberg & Freilich
ATTORNEYS

CARTRIDGE CONTAINING TWO ENDLESS LOOPS OF MAGNETIC TAPE

BACKGROUND OF THE INVENTION

This invention relates to magnetic tape cartridges, and more particularly to a novel arrangement for two endless loops of magnetic tape spirally wound on separate platforms in a cartridge adapted for recording and reproducing sound selectively on either one of the two loops.

Magnetic recording and reproducing apparatus have been devised for use with endless loops of magnetic tape. Such devices have come into widespread use, particularly as mobile units adapted to receive a cartridge in a slot in such a manner as to have a driven capstan and transducers engage the magnetic tape through apertures in the cartridge case.

In a first type of cartridge, the surface of the tape coated with magnetic material is exposed for engagement by external transducers through apertures in one end wall of the cartridge. A separate aperture is provided in the bottom wall of the cartridge to allow an external pressure roller to engage the backside of the tape and exert some pressure on it against the capstan when the cartridge is inserted for recording or reproducing sound. The tape is exposed for engagement by a capstan and external transducers through apertures in an end wall similar to cartridges of the first type. However, instead of providing an aperture in the bottom wall for receiving an external pressure roller, there is provided an internal pressure roller, or the like (such as a pressure pad) behind the tape opposite the aperture which receives the external capstan.

The dimensional specifications for these two types of cartridges have been standardized by the Electronic Industries Association (Standard RS-332) in order to permit interchangeability of cartridges in sound recording and reproducing (playback) apparatus produced by different manufacturers. The standardized dimensions concern primarily that end of the cartridge intended to be inserted into such apparatus. Since the standard is dimensional in character, a cartridge of any design or configuration which satisfies the standard to the extent of meeting the objective of interchangeability is deemed to be a standard cartridge. The term "standard cartridge" or "standard case" is therefore used herein to mean any cartridge or case which meets the objective of the standard, and not just those that conform to all of the specifications of the standard.

Regardless of the type of cartridge, the tape is retained within a case designed to satisfy the standard dimensional specifications. The tape is generally spirally wound or coiled on a platform around a hub. The innermost convolution of the coil is fed out from the hub through internal tape guides past apertures in the case. The apertures are spaced in accordance with the aforesaid standard dimensional specification to permit a capstan and transducers to engage the tape.

The apertures for the transducers precede the aperture for the capstan. From there the tape is fed directly to the outer convolution of the coil. Thus, once the two ends of a coiled tape are spliced to form an endless loop and threaded past the apertures, the case is closed to provide a tape cartridge ready for use in recording and reproducing apparatus.

In use, tape in the inner convolution of the coil is continually pulled out by the capstan at a substantially constant linear velocity. That causes the coil to rotate about the hub at a substantially constant angular velocity. To facilitate that rotation, the practice is to arrange the hub and platform to rotate as a unit about a fixed pin, such as by forming the hub and platform as an integral unit, but not necessarily in a unitary structure for in some cartridge designs the platform is permitted to slip relative to the hub to allow the angular velocity of the platform to be less than that of the hub.

Since the outermost convolution of the coil has a greater diameter than the innermost convolution the rotating platform tends to cause the tape in the outer convolution to move at a greater linear velocity than at the hub. However, the tape being fed back on the coil from the capstan is limited in its linear velocity to the velocity with which the capstan is pulling tape out from the innermost convolution. The tape is therefore continually slipping on the platform, with frictional forces acting between the edge of the tape coiled on the platform and the platform surface to maintain substantially uniform tension on the tape as it is returned to the coil from the capstan. These forces also tend to cause each turn of the tape on the coil to continually decrease in diameter as tape is pulled out from the innermost convolution. The result is a tendency to tighten the innermost convolution of the tape on the hub sufficiently to increase frictional forces between the innermost convolution and the hub. The hub and platform are thus rotated as tape is pulled from the innermost convolution by the capstan.

Internal tape guides are provided within the case of a cartridge to maintain the tape within an appropriate path, particularly that portion of path past apertures provided for transducers since it is in that area of a cartridge that adherence to standard dimensional specifications is most important in cartridges of either the type having an internal pressure roller or capstan pressure pad, or the type having an external pressure roller. When a cartridge of either type is clamped in proper position for recording or reproducing sound, adequate contact is maintained between the capstan and the pressure roller, or pad, with transducer head penetration through apertures sufficient to assure good contact with the magnetic tape and in proper alignment. The bottom wall of the cartridge and the edges of the tape are used in the references in guiding tape past the transducer apertures. That assures good tracking for recording and reproducing sound on four or eight separate tracks of ¼-inch tape.

OBJECTS AND SUMMARY OF THE INVENTION

A cartridge for an endless loop of magnetic tape is provided with a second endless loop of magnetic tape using a case having two opposing apertured ends adapted for insertion into recording and playback apparatus. Separate but coaxial hub and platform assemblies are provided for coils of the endless loops of tape, and separate guiding means is provided for each tape, one to guide one tape past apertures in one end wall, and another to guide the second tape past apertures in the opposite end wall. Each guiding means employs the same bottom wall and the edges of the tape as references for guiding the tape past the apertures, particularly the apertures adapted to receive transducers, with provision for receiving an external tape guide, or guides, through the apertures adapted to receive transducers. A given tape is selected for recording or playback by inserting that end of the case into the apparatus. A capstan and transducing heads in the apparatus may engage the tape through apertures in the wall at the end inserted.

Therefore, an object of this invention is to provide a cartridge with two separate endless loops of magnetic tape.

A further object is to provide a cartridge having two standard ends with two separate endless loops of magnetic tape, each associated with only one end for recording and reproducing sound.

BRIEF DESCRIPTION OF THE DRAWINGS

These and other objects of the invention will best be understood from the following description, taken in connection with the accompanying drawings in which:

FIG. 8 illustrates two hub and platform assemblies on a common spindle in an enlarged view.

DESCRIPTION OF THE PREFERRED EMBODIMENTS

Figure 1:
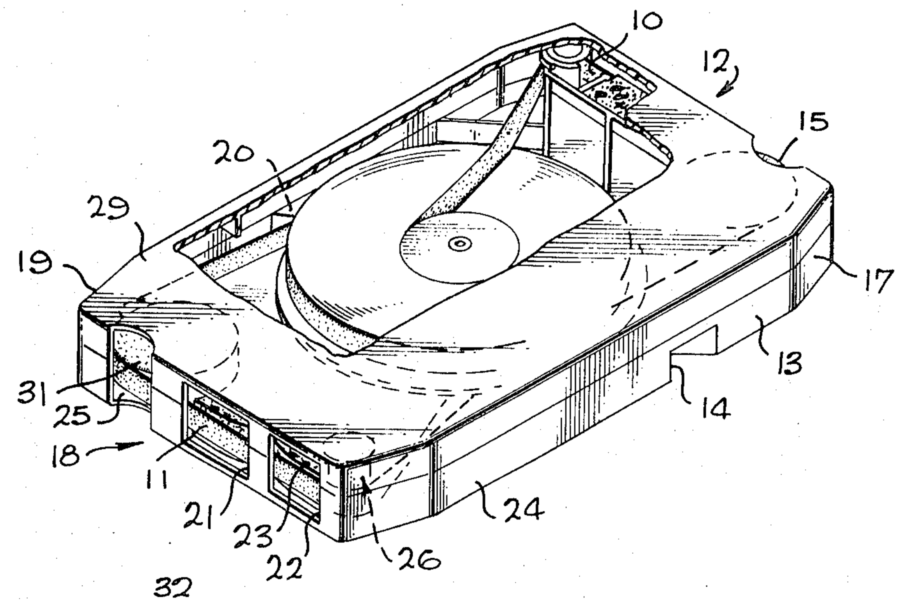
FIG. 1 illustrates in an isometric view an exemplary embodiment of the present invention with a portion broken away to better show internal details.

As illustrated in the isometric view of FIG. 1, the preferred embodiment of the present invention is a double-ended cartridge of the type adapted to be inserted into apparatus for recording or playing back sound using one of two endless loops of tape 10 and 11, depending upon which end of the cartridge is inserted into the apparatus. For example, to use the endless loop 10, a first end 12 of the cartridge is inserted into the using apparatus sufficiently to enable a spring-loaded pin of the apparatus to ride along a sidewall 13 and engage a notch 14. The force of a spring-loaded pin (of the using apparatus not shown) is sufficient to clamp the cartridge in proper position in order to maintain adequate contact between a capstan of the apparatus and the tape 10 against a pressure roller 15 through an aperture 16. A corner 17 of the cartridge on the left of the end 12 (as viewed from the using apparatus) is sloped in order to deflect a mechanism in the apparatus intended to raise an external pressure roller into the cartridge through an aperture in the bottom wall when the cartridge is used in apparatus adapted for cartridges of either type, namely cartridges of the type illustrated having an internal pressure roller and cartridges of the type adapted to receive an external pressure roller from the using apparatus.

If the endless loop 11 is to be used for recording or reproducing sound, the opposite end 18 is inserted into the using apparatus in the same manner as the end 12. As in the first end, a corner 19 on the left is sloped and a notch 20 is provided in order that the spring-loaded pin may engage it. In that manner, both ends 12 and 18 are made alike, and each conforms to the Electronic Industries Association standard RS-332.

Referring to the end 18, apertures 21 and 22 are provided as openings for transducers mounted in the using apparatus. The aperture 21 is for recording and playback transducers and the aperture 22 is for a transducer which detects a film of conductive material on a small segment of the loop 11 to indicate when the full length of the loop has been transported past the aperture 22. A channel control circuit in the using apparatus is then activated to switch the recording or playback transducers from one channel (or pair of channels in a stereo recording) to another. Thus, the transducer received through the aperture 22 may consist of simply two switch contacts which are momentarily connected by the conductive film. A pressure pad 23 is provided to maintain adequate contact between the endless-loop tape and the transducers. Since the end 18 of the cartridge conforms to the aforesaid standards, penetration of the transducers will be sufficient to assure good contact with the magnetic tape.

Figure 2:
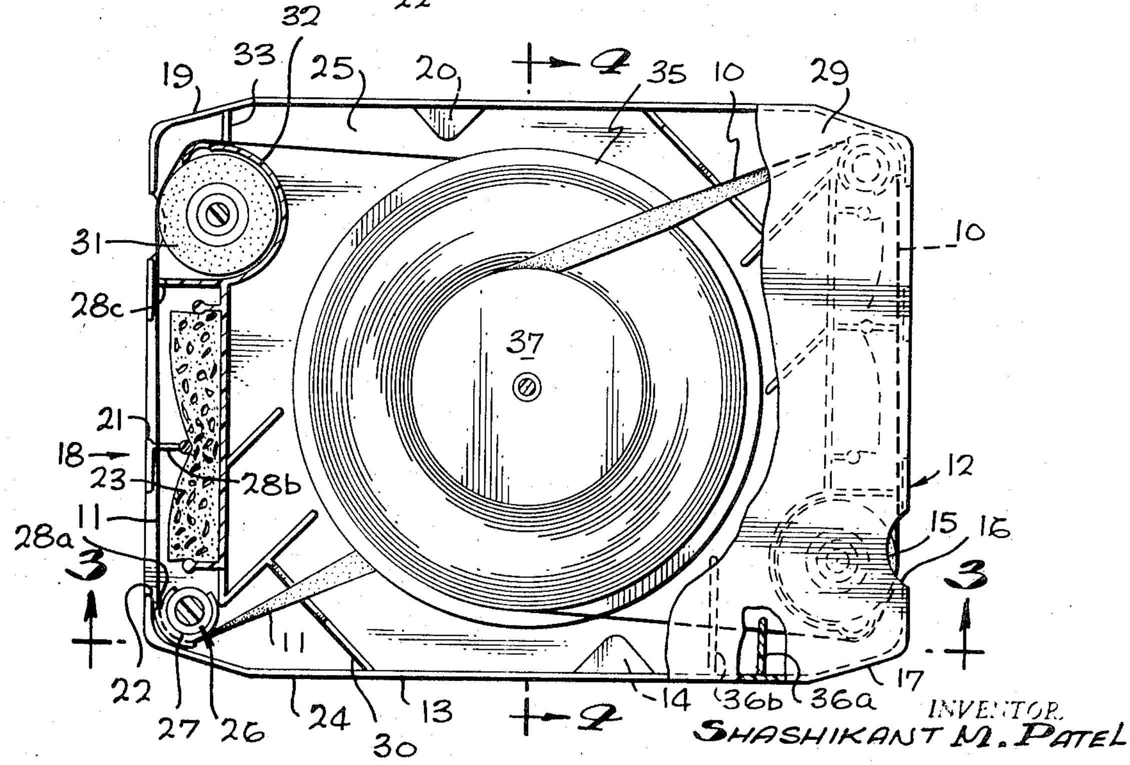
FIG. 2 illustrates the embodiment of FIG. 1 in a plan view with a greater portion broken away to show internal details.
Figure 4:
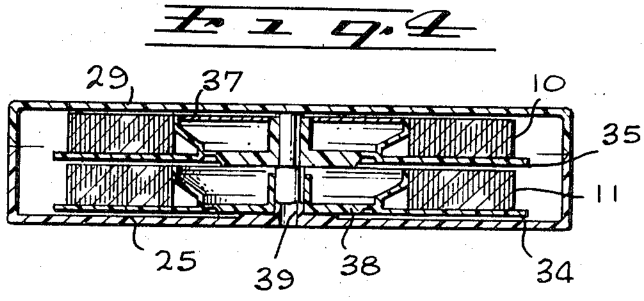
FIG. 4 is a sectional view taken along the line 4—4 of FIG. 2.
Figure 5:
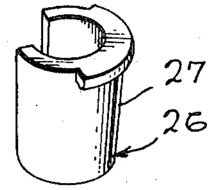
FIG. 5 is an enlarged view of a sleeve fitted over a tape guide post to facilitate guiding the tape through a turn greater than 270° while the level of the tape is being altered.

When using the endless-loop tape 11, a sidewall 24 opposite the notch 20 constitutes the "dimensional base line" for proper registration of the magnetic tape with the transducers penetrating the apertures 21 and 22. The bottom wall 25 (FIGS. 2, 3 and 4) provides another "dimensional base line" for registration of the magnetic tape in a direction normal to the edges of the magnetic tape. Accordingly, the front end 18 is provided with tape guiding means comprising a tape guide post 26 having a tapered sleeve 27. The upper end of the sleeve is flanged over a substantial portion, such as one-third to one-half of its circumference in that portion through which the tape turns the corner, as shown in FIGS. 2 and 5. Webs 28*a*, 28*b* and 28*c* shown in FIG. 2, guide the lower edge of the tape 11 at the standard height above the bottom wall 25. Similar and opposing webs on the upper wall 29 of the cartridge case guide the upper edge of the tape.

Figure 3:
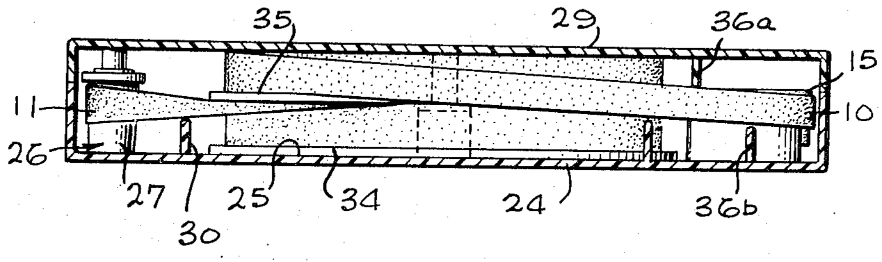
FIG. 3 is a sectional view taken along the line 3—3 of FIG. 2.

The outer diameter of the sleeve 27 is preferably tapered to conform to the angle of the tape with reference to the bottom wall as the tape changes direction, as shown in FIG. 2. Thus, the taper should be with a smaller outside diameter for the sleeve near the bottom wall, as shown in FIG. 5. The sleeve is locked into position with the flange thereof on the outside of the turn that the tape makes in order to always contain the upper edge of the tape fed to the apertures. A web 30 is provided to urge the tape up on the sleeve 27 against the flange thereof, as shown in FIG. 3.

An arcuate web 32 behind the pressure roller 31 keeps the tape out of the way of the roller except over the small sector engaged by the capstan of the using apparatus. While the web 28*c* guides the lower edge of the tape onto the roller 31, a web 33 guides the lower edge of the tape at the standard height above the lower bottom wall 25 as it leaves the roller.

It should be noted that the guiding means provided for the tape in the cartridge need be only sufficient to present the tape to the apertures 21 and 22 at approximately the center which, for a cartridge having an outside dimensional thickness of 0.86 to 0.89 inches, requires only that the tape be spaced from the outside of the bottom wall 0.290 to 0.305 inches for the lower edge and 0.560 to 0.570 inches for the upper edge. For precise guidance of the tape relative to transducers received through the apertures 21 and 22, external tape guides are provided by the using apparatus, such as properly spaced forks, through areas of the apertures 21 and 22 with prongs above and below the tape.

The arrangement of a tape-guiding means for the tape 10 at the other end 12 of the cartridge is similar in configuration and arrangement. In that regard it should be noted that the aperture for the capstan is on the left in each instance as the end to be used is viewed from the using apparatus. Accordingly, tape is being transported past the apertures in the same direction, namely left to right, for both endless loops of tape 10 and 11. However, whereas tape 11 is fed from a lower platform 34, tape 10 is fed from a higher platform 35, as may be seen in FIG. 3. Accordingly, a web 36*a* (FIG. 3) is provided to urge the tape 10 downwardly as it is pulled from its coil, while a web 36*b* (FIGS. 2 and 3) extends upwardly from the bottom wall 25 to a height sufficient to elevate the tape 10 to the platform 35.

The bulk of each of the endless loops 10 and 11 is stored in coils wound on a supporting platform around a hub. As tape is pulled from the innermost convolution of the coil on the platform 35, a hub 37 provides sufficient friction against the tape to cause it to rotate clockwise, thereby causing the platform 35 to rotate in the same direction in order to rewind tape pulled from the coil on the outermost convolution of the coil.

Figure 6:
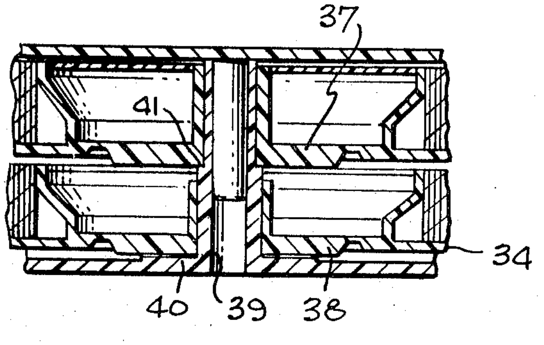

Since the coil wound on the platform 35 is of greater diameter than the hub 37, the coil on the rotating platform 35 tends to take up tape at a greater linear velocity than the linear velocity with which it is being pulled from the inner convolution of the coil, thereby maintaining tension on the tape between the pressure roller 15 and the coil of tape on the platform 35. When the tension is sufficient to overcome friction between the coil and the platform 35, the platform 35 will slip ahead of the coil as the two continue to rotate. To decrease that friction, the platform 35 may be formed separately in such a way that the platform 35 will slip on the hub 37 with a smaller force of friction. However, in this exemplary embodiment of the present invention, the platform 35 is formed as a unitary part of the hub 37 as shown in FIGS. 4 and 6. The platform 34 is similarly formed as a unitary part of a hub 38 for the coil of the tape 11 as shown in FIG. 4.

The hub and platform assemblies for the endless loops of tape 10 and 11 are preferably mounted coaxially on a hollow spindle 39 as shown in FIG. 6. The spindle 39 is molded on the bottom wall 25 at approximately the center of the cartridge, and extends from the bottom wall 25 to the top wall 29. Thus, each of the coils on the platforms 33 and 35 are offset from the middle of the cartridge which the coil normally occupies in conventional cartridges having a single endless loop of tape.

The spindle 39 is cast on a thin base 40 of relatively small area, as shown in FIG. 6, to provide a space between the bottom wall 25 and the platform 34. That is for the purpose of minimizing friction of the platform against the bottom wall. In addition, the bottom wall may be provided with a few very thin and equally spaced radial webs beneath the circumferential portion of the platform 34 to minimize friction of that portion against the bottom wall in the event the platform 34 should become warped.

The bottom half of the spindle is provided with a greater diameter than the top half in order to provide a shoulder 41 of relatively small area on which the hub 37 will rotate and carry the platform 35. The shoulder 41 is spaced a height above the bottom wall sufficient to allow the hub 37 and platform 35 to rotate without contacting the hub 38 and the coil of tape on the platform 34 below.

The upper half of the cartridge case may be molded with a locking pin (not shown) extending downwardly from the wall 29 and adapted to enter the center of the hollow spindle 39. A hooked end of the pin may then engage a ledge in the spindle to lock the upper half of the cartridge case against the lower half with the two hub and platform assemblies in place. Similar locking pins may be provided on the corners in the hollow guide posts and in hollow spindles for the pressure rollers.

Figure 7:
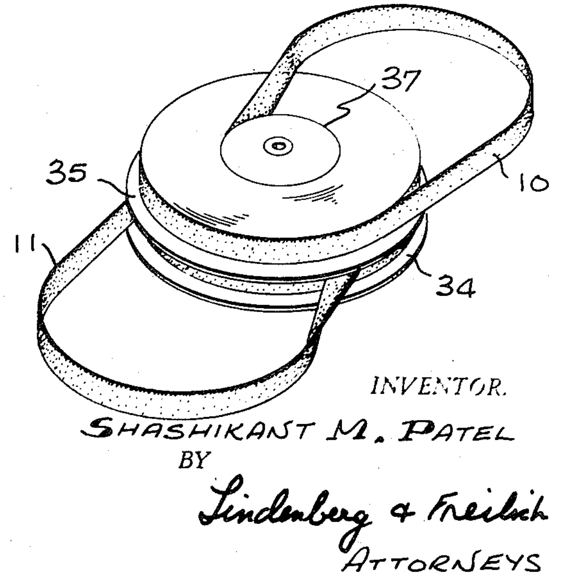
FIG. 7 illustrates in an isometric view two hub and platform assemblies each fitted with an endless loop of tape ready for use in a cartridge.

Before the two hub and platform assemblies are mounted on the spindle 39, the endless loops of tape are coiled as shown in FIG. 7. Then once the assemblies are mounted, the tapes are placed in the paths shown in FIGS. 1 and 2 before the upper half of the case comprising the upper plate 29 is secured in place against the upper end of the spindle 39.

Once the upper half of the cartridge case has been added to the assembly, and secured in place, the cartridge is ready for use. To select one of the tapes 10 and 11 for use in recording or reproducing sound, it is simply necessary to insert the end of the cartridge associated with the selected tape into the using apparatus.

What is claimed is:

1. A cartridge of magnetic tape comprising:

a substantially rectangular case having a top wall, a bottom wall, and first and second end walls at opposite ends of said case, and having apertures in each of said end walls for receiving at a selected end a capstan and transducer means from an external utilization device;

first and second rotatable assemblies, each comprising a hub and platform;

means for supporting within said case said first and second rotatable assemblies:

a first endless loop of magnetic tape coiled around said hub of said first assembly and supported by said platform of said first assembly with tape pulled from the innermost convolution thereof fed to the outermost convolution thereof;

means for guiding tape of said first endless loop past said apertures in said first end wall of said case as said first hub and platform assembly is caused to rotate in a given direction in response to tape being pulled from the innermost convolution of said first loop of magnetic tape;

a second endless loop of magnetic tape coiled around said hub of said second assembly, and supported by said platform of said second assembly, with tape pulled from the innermost convolution thereof fed to the outermost convolution thereof; and means for guiding tape of said second endless loop past said apertures in said second end wall of said case as said second hub and platform assembly is caused to rotate in said given direction in response to tape being pulled from the innermost convolution of said second loop of magnetic tape.

2. A cartridge as defined in claim 1 wherein said supporting means comprises a spindle supported within said case by said bottom wall in a fixed perpendicular position, and both of said first and second rotatable assemblies are mounted for rotation on said spindle.

3. A cartridge as defined in claim 2 wherein said supporting means further comprises a base for supporting said first rotatable assembly away from said bottom wall, said base having a support area less than apposing surface area of said first rotatable assembly, whereby friction is reduced when said first rotatable assembly rotates, and means for spacing said second rotatable assembly away from said first rotatable assembly for independent rotation of said second rotatable assembly, said spacing means having a support area for said second rotatable assembly less than apposing surface area of said second rotatable assembly, whereby friction is reduced when said second rotatable assembly rotates.

4. A cartridge as defined in claim 3 wherein said spacing means is a shoulder provided on said spindle by a portion passing through said first rotatable assembly of a diameter greater than a portion passing through said second rotatable assembly.

5. A cartridge as defined in claim 4 having standard dimensional characteristics for interchangeable use in different sound recording and reproducing apparatus wherein tape is guided past end wall apertures in a path substantially midway between said top and bottom walls, and said coils of endless tape are supported by said platforms with tape edges displaced from edges of tape in said path.

6. In combination, a case for a magnetic tape cartridge having two apposing apertured ends, each end of said case being adapted to be inserted selectively into using apparatus, said case containing two hubs and two separate continuous loops of magnetic tape, each wound as a coil onto a separate one of said hubs and guided past apertures at a different end of said case, and means for supporting each hub between top and bottom walls of said case.

7. The combination of claim 6 wherein each hub is provided with a platform to support said coil wound thereon, said hub and platform associated with one coil being coaxial with the hub and platform of the other coil.

8. The combination of claim 7 wherein each of said coils is adapted to rotate in the same direction when viewed from the top thereof as tape is driven past apertures in one end of said case from one coil, and as tape is driven past apertures in the other end of said coil from the other coil, and each of said coils rotates with its hub and platform independently of rotation of the other coil with its hub and platform.

9. The combination of claim 8 wherein the continuous loop of a given magnetic tape is guided past said apertures at a level approximately equidistant from said top and bottom walls while the coil into which said given tape is wound is supported closer to one of said top and bottom walls.

* * * * *